United States Patent
Bleijenberg et al.

(12) 
(10) Patent No.: US 6,610,798 B1
(45) Date of Patent: Aug. 26, 2003

(54) CONTROLLED SUSPENSION POLYMERIZATION PROCESS WITHOUT MECHANICAL AGITATION

(75) Inventors: Karel Cornelis Bleijenberg, Breda (NL); Grazyna Petela, Calgary (CA)

(73) Assignee: Nova Chemical Inc., Moon Township, PA (US)

( * ) Notice: Subject to any disclaimer, the term of this patent is extended or adjusted under 35 U.S.C. 154(b) by 0 days.

(21) Appl. No.: 10/266,812

(22) Filed: Oct. 8, 2002

(51) Int. Cl.[7] .............................. C08F 2/00; B01F 13/02
(52) U.S. Cl. ........................... 526/88; 526/64; 526/202; 526/922; 521/56; 521/60; 366/101; 366/106; 366/107
(58) Field of Search .............. 526/88, 64, 202, 526/922; 521/56, 60; 366/101, 106, 107

(56) References Cited

U.S. PATENT DOCUMENTS

| | | | |
|---|---|---|---|
| 3,922,255 A | 11/1975 | Koestler et al. | 260/80.78 |
| 4,427,794 A | 1/1984 | Lange et al. | 521/28 |
| 4,444,961 A | 4/1984 | Timm | 526/88 |
| 4,487,898 A | * 12/1984 | Kato et al. | 526/65 |
| 4,623,706 A | 11/1986 | Timm et al. | 526/88 |
| 4,666,673 A | 5/1987 | Timm | 422/135 |
| 4,870,143 A | * 9/1989 | Hashiguchi et al. | 526/70 |
| 5,061,741 A | 10/1991 | Miyata et al. | 523/319 |

OTHER PUBLICATIONS

A. Nienow, D. Wisdom, J. Middleton, The Effect of Scale and Geometry on Flooding, Recirculation, and Power in Gassed Stirred Vessels, 2nd European Conference, Mar. 30–Apr. 1, 1977.

C. Chapman, A. Nienow, M. Cooke, and J. Middleton, Particle–Gas–Liquid Mixing in Stirred Vessels, Chem Eng. Res Des. vol. 61 Mar. 1983, pp. 82–95.

M. Warmoeskerken and J. Smith, The Flooding Transition with Gassed Rushton Turbines, Symposium Series No. 89, 1984, pp. 59–66.

A. Nienow, M. Warmoeskerken, J. Smith and M. Konno, On the Flooding/Loading Transition and the Complete Dispersal Condition in Airated Vessels Agitated by a Rushton–Turbine, 5th European Conference on Mixing, Wurzburg, West Germany, Jun. 10–12, 1985, Paper 15, pp. 143154.

W. Bujalski, M. Konno and A. Nienow, Scale–Up of 45° Pitch Blade Agitators for Gas Dispersion and Solid Suspension, 6th European Conference on Mixing, Pavia, Italy, May 24–26, 1988, p. 389–398.

* cited by examiner

Primary Examiner—Fred Teskin
(74) Attorney, Agent, or Firm—Kenneth H. Johnson

(57) ABSTRACT

Non-Newtonian fluids, such as partially polymerized monomers or solutions of polymer in monomer may be pressure atomized below the free surface of a continuous liquid phase to produce a dispersed phase. A uniform or customized droplet size distribution can be obtained by imposing a required pressure pulsation on a flowing monomer upstream the atomizer inlet. This initial particle size distribution can be maintained or modified during subsequent polymerization process in a low shear, controlled turbulence flow pattern, created without mechanical agitation within the continuous liquid, by continuously or periodically injecting an inert gas at selected locations within the reactor.

40 Claims, 7 Drawing Sheets

A-A

CONTROLLED SUSPENSION POLYMERIZATION PROCESS WITHOUT MECHANICAL AGITATION

FIELD OF THE INVENTION

The present invention relates to the concurrent or sequential application of atomization technology to pressure atomizing a Non-Newtonian liquid in order to form a dispersed phase having a controlled particle size distribution within another liquid, typically immiscible, which forms a continuous phase and to maintain or modify this initial particle size during the subsequent polymerization process in the continuous phase contained in a vessel, using a method to create without mechanical agitation a low shear, controlled (preferably low) turbulence flow pattern within a continuous liquid, by continuously or periodically injecting and preferably recycling a neutral immiscible lighter (less dense) fluid, preferably gas, below the free surface of the continuous phase. In one preferred embodiment the liquid being atomized is a partially polymerized mixture of one or more monomers and is subjected to pressure pulsation upstream the atomizer inlet. In other embodiments of the invention the gas is injected into the reactor to create bubbles either substantially larger or at least an order of magnitude smaller than the average size of the dispersed phase.

BACKGROUND OF THE INVENTION

The present invention teaches the application of high pressure atomization as the method to disperse an organic phase. It has been proposed to atomize and coat monomer droplets in an aqueous medium to form a suspension (Review article E Vivaldo-Lilma et al., *An updated review on suspension polymerization. Ind. Eng. Chem.*, (36) (1997) of S. Matsumoto et al., *A production process for uniform-size polymer particles. J of Chem. Eng. Of Japan*, vol. 22, No. 6 1989), using coaxial nozzles and injecting the monomer mixture through the inner nozzle and the coating composition through the outer nozzle. The shell of the resulting coated particle is hardened chemically or physically to form a capsule which may be suspended in water and polymerized. Subsequent to polymerization the outer shell is removed from the polymer. The present invention has eliminated an essential feature of the art, as it does not contemplate the formation of a shell about the monomers.

Comparable encapsulation technology is disclosed in U.S. Pat. No. 4,427,794 issued Jan. 24, 1984 assigned to Bayer A. G. Rather than using coaxial nozzles, the patent teaches an encapsulation medium separate from the continuous aqueous phase. As noted above the present invention has eliminated the essential feature of encapsulation required by this reference.

U.S. Pat. No. 5,061,741 issued Oct. 29, 1991, assigned to Mitsubishi Kasei Corporation discloses a method for preparing oil in water type dispersions. The oil is a monomer or monomer mixture which is not pre-polymerized (i.e. a Newtonian liquid to be atomized). The reference fails to teach or suggest the atomization of a non-Newtonian liquid as required by the present invention. Further the reference fails to teach the application of elevated pressure to atomize the oil (monomer) phase. Additionally, the reference teaches the monomer and continuous phases are at relatively low temperatures not exceeding about 30° C. A critical feature of the reference is the use of a disperser plate having nozzles in an annular design. The patent teaches away from the present invention in that a disperser plate having an annular layout for the nozzles is not required and the atomizing nozzles may be uniformly distributed over the disperser or orifice plate.

U.S. Pat. No. 3,922,255 issued Nov. 25, 1975 assigned to Rohm and Haas Company teaches atomizing unpolymerized monomers into a continuous water phase. The monomers are not polymerized and therefore are Newtonian. Further the reference fails to teach applying a pressure pulsation to monomer feed to the atomizers. The reference fails to teach the subject matter of the present invention.

There is a series of patents in the name of Timm, assigned to the Dow Chemicals Company which teach dispersing monomer droplets in a continuous phase by subjecting a jet of a monomer mixture to vibratory excitement. This art includes U.S. Pat. Nos. 4,444,961; 4,666,673; and 4,623,706. The references fail to teach atomization of a non-Newtonian liquid. Further the references fail to teach the application of high pressure to the phase to be atomized. Further the flow rate of the atomized phase of the Timms references appear to be up to an order of magnitude lower during the dispersion process than the flow rate of the present invention.

The present invention further teaches to process polymerize the dispersed phase in a flow pattern in a continuous phase created by gas injection. There is a prior art relating to the injection of gas into a continuous liquid phase in sparging and, less often, surface aeration systems. Mechanically agitated tanks are usually used for this task and the main purpose of these systems is to disperse a gaseous component within a liquid component, (e.g. ethylene gas in liquid styrene) for further processing. Other applications involve high pressure gas injection to aid mechanical agitation/stirring by intensifying the mixing and increasing turbulence level in a stirred tank. All these systems operate in highly turbulent regimes and are equipped with mechanical agitators, (Wessner et al, 2002, Nienow et al 1977, Nienow et al., 1985a, Tatterson 1991, Bujalski 1988, Warmoeskerken et al 1984, Chapman et al, 1983). These references teach the technology based on the principles which are quite opposed to the ones proposed in the present invention in that a low shear, low turbulence flow pattern is created in the reactor by gas injection and no mechanical agitation is required. There are also numerous applications of in situ gas injection to remediate contaminated aquifers or soil matrix, but they serve a totally different purpose and operate also on different principles than process described in the present invention.

The present invention seeks to provide a process to pressure atomize non-Newtonian immiscible liquids into a continuous liquid medium and maintain, improve, or alter (reduce) the dispersed droplet size during the subsequent polymerization process by the controlled recirculation of an inert gas through the continuous liquid medium.

SUMMARY OF THE INVENTION

The present invention provides a process comprising pressure atomizing from 0.01 to 60 volume % of a non-Newtonian immiscible liquid having a density ±20% of the density of the continuous phase, at a pressure of at least 5 bar, below the free surface of a continuous liquid phase which may be stationary or flowing, contained in a tank, pipe or loop vessel, to produce a dispersion of atomized droplets having at least one controlled average diameter from 0.1 mm to 10 mm and to maintain or modify this initial size distribution during the subsequent polymerization by distributing the dispersed phase in a controlled low turbulence flow pattern, created without mechanical agitation in a continuous phase by continuously or periodically injecting at gauge pressure up to 15 bar into selected parts of the reactor one or more streams of gas inert to the reactor contents having a density lower than the continuous phase and immiscible with the reactor contents and recovering this gas from the top of reactor, above free surface of the continuous phase. Preferably the gas is recycled back to the injection ports of the reactor.

In one preferred embodiment the liquid being atomized is a partially polymerized mixture of one or more monomers and is subjected to instantaneous pressure pulsation Upstream the atomizer inlet.

In other embodiments of the invention the gas is injected into the reactor to create bubbles either substantially larger or at least an order of magnitude smaller than the average size of the dispersed phase.

DETAILED DESCRIPTION

Figure 1:
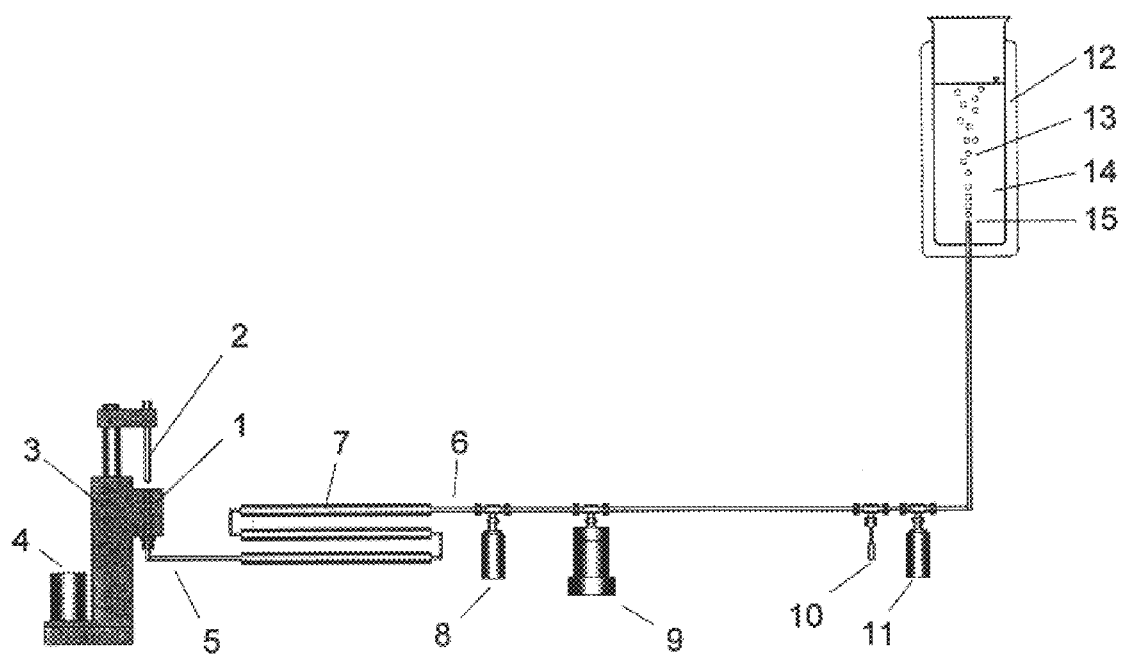
FIG. 1 is an overall schematic diagram of the experimental setup used to atomize the partially polymerized monomer.
Figure 2:
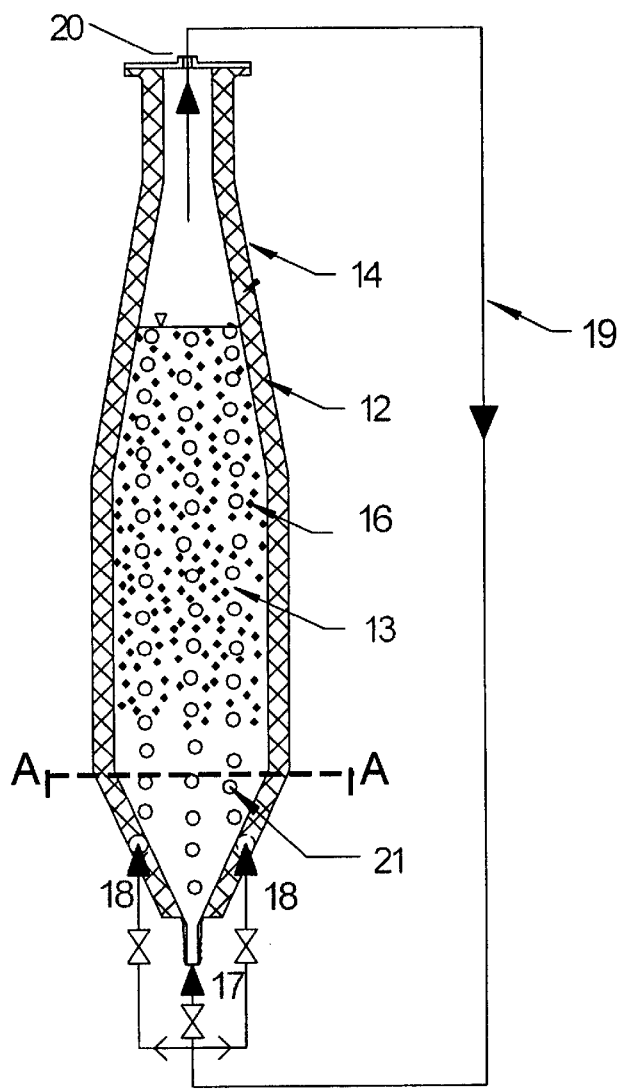
FIG. 2 is a schematic diagram of the vessel used to conduct the polymerization experiments.
Figure 3:
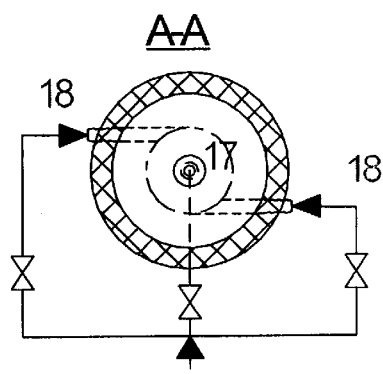
FIG. 3 is a sectional view at A—A of FIG. 2.

As used in this specification, particles may be solid or liquid and droplets are liquid.

As used in this specification "non-Newtonian" means a liquid which does not have a linear relationship between shear stress and fluid strain rate. Generally non-Newtonian liquids exhibit shear thinning (pseudoplastic) or shear thickening (dilatent). All gases, water (salt and fresh) and most unpolymerized hydrocarbons are Newtonian liquids.

As used herein "visco-elastic liquid" means a liquid which has conjoint viscous and elastic properties. Typically these materials tend to be more viscous than water and if deformed under shear will tend to return to their pre-shear condition if the shear is removed.

The fluid to be atomized in accordance with the present invention and the continuous phase fluid (suspending liquid or medium) are immiscible.

The immiscible fluids useful in accordance with the present invention to form a dispersed phase are non-Newtonian fluids, preferably non-Newtonian liquids.

The non-Newtonian liquids used in accordance with the present invention may also be visco elastic liquids.

Typically the Non-Newtonian and visco-elastic liquids to be atomized to form the dispersed phase are partially polymerized monomers typically polymerized at least to 25%, generally from 25 to 50%, preferably from 30 to 45%, most preferably from 30 to 40% conversion of monomers or solutions of one or more polymers in one or more monomers listed below, having dissolved therein typically not less than 25 weight %, generally from 25 to 50 weight %, preferably from 30 to 40 weight % of the polymer. Typically the polymer will be a co- or homopolymer of the monomers listed below. However other polymers may be used, such as polyolefins (e.g. polyethylene), polycarbonates (polyphenylene oxides) and impact (rubber modified) forms of such polymers such as high impact polystyrene (HIPS). The impact modified polymers typically contain as a dispersed phase from about 2 to 30, weight % of one or more rubbers selected from the group consisting of:

(a) co- or homopolymers of $C_{4-6}$ conjugated diolefins (i.e. diene rubbers);

(b) random, block, and tapered copolymers comprising from 30 to 70, preferably from 40 to 60, weight % of one or more $C_{8-12}$ vinyl aromatic monomers which are unsubstituted or substituted by a $C_{1-4}$ alkyl radical; and from 70 to 30, preferably from 60 to 40 weight % of one or more $C_{.4-6}$ conjugated diolefins (e.g. styrene butadiene rubbers or SBR); and (c) copolymers comprising from 5 to 50 weight % of acrylonitrile or methacrylonitrile and from 50 to 95 weight % of one or more $C_{4-6}$ conjugated diolefins (e.g. nitrile rubbers).

The polymers may also include acrylonitrile butadiene styrene (ABS) polymers and butyl acrylate (homopolymer) modified poly acrylates such as poly methyl methacrylate or styrene acrylates such as polymers comprising from about 5 to 50 weight % of methyl methacrylate and from about 50 to 95 weight % of a vinyl aromatic monomer as described above. The polymer may be a polyolefin such as polyethylene or copolymers of ethylene and up to about 20 weight % of a $C_{4-8}$ mono, preferably alpha, olefin such as butene, hexene and octene or a copolymer of ethylene and up to about 40 weight % of an ethylenically unsaturated carboxylic acid such as a copolymer of ethylene and acrylic acid. Such solutions of polymers in monomers are also non-Newtonian visco elastic immiscible liquids. The monomers or mixture of monomers suitable for use in the present invention to form a dispersed phase include any monomer or monomers which can be emulsion or suspension polymerized. Typically the one or more monomers may be selected from the group consisting of $C_{8-12}$ vinyl aromatic monomers which are unsubstituted or substituted by up to two substituents selected from the group consisting of $C_{1-4}$ alkyl radicals; acrylonitrile; methacrylonitrile; maleic anhydride; malimide; and $C_{1-4}$ alkyl esters of $C_{1-6}$ monocarboxylic acids.

Suitable vinyl aromatic monomers include styrene, alpha methyl styrene and para methyl styrene. Suitable alkyl esters of $C_{1-6}$ monocarboxylic acids include methyl methacrylate, ethyl methacrylate, butyl methacrylate, methyl acrylate, ethyl acrylate and butyl acrylate.

Preferably the monomer is styrene which has been polymerized from 25 to 50% conversion, typically from 30 to 45%, preferably from 30 to 40% conversion.

Generally the liquid to be atomized will have a viscosity between 0.1 and 4000 centipoise (cP) preferably between 100 and 2500 cP, most preferably between 100 and 2000 cP.

The continuous phase (suspension medium) is preferably selected to enhance the production of the uniform droplets of the immiscible liquid. Preferably the viscosity of the continuous phase may be up to about 150 cP. Droplet formation (atomization) and their subsequent movement through the suspension medium may be easier and more effective when the viscosity of the continuous phase is the same order of magnitude or less than the viscosity of the dispersed liquid. Generally, the suspension medium has a viscosity in the range from 0.01 to 400 cP. The viscosity of the continuous phase may be from about 0.01 to about 1, preferably from about 0.05 to about 0.5 times the viscosity of the atomized liquid, and viscosity of the continuous phase may range from 0.1 to 400 cP, typically up to 150 cP, most preferably about 1 to 100 cP.

In addition, the suspension medium may have a sufficiently different density from that of the atomized liquid. Preferably the density of the suspending medium is greater than or equal to the density of the droplets of the atomized liquid, with the density of the suspension medium typically being from about 1.02, to about 1.2, times the density of the droplets of atomized liquid. If the atomized liquid (e.g. the dispersed phase) is further polymerized the density of the droplets or particles of the dispersed phase may change and typically increase. Alternatively, if the droplets of the atomized liquid were to descend through the suspension medium, the density of the suspension medium may be from about 0.98 to about 0.90 times the density of the droplets of atomized liquid.

The continuous phase is suitably any inert liquid which is immiscible with the partially polymerized monomer or polymer in monomer solution. The term "immiscible" meaning less than about 1 weight percent of the partially polymerized monomer or polymer in monomer solution is miscible (or soluble) in the suspending liquid (i.e. the continuous phase does not solvate more than about 1 weight percent of the partially polymerized monomer or polymer in monomer solution). Preferably less than about 0.1 weight percent of the partially polymerized monomer or polymer in monomer solution is miscible in the suspending liquid.

Typically, the continuous phase (suspending liquid) is water. However, mixtures of water with one or more water-miscible organic liquids such as the lower alkyl alcohols such as methanol or butanol may be used. The addition of organic liquids which are immiscible with the dispersed phase and may or may not be immiscible with the continuous phase, and salts may be used to vary (increase) the density of the continuous phase. Preferably, water is employed as the continuous phase.

Generally in the practice of this invention, the continuous phase (suspending liquid) will contain a surfactant or suspending aid. However it is also possible to add the suspending aid to the liquid to be atomized. Suitable suspending aids are those materials which enable the formation of the monomer phase into spheroidal droplets of a desired size and which hinder the coalescence or secondary dispersion (breakage) of the thus-formed droplets.

Suspension stabilizers are well known in the art and comprise organic stabilizers, such as poly (vinyl alcohol), preferably hydrolyzed at least 70%, typically up to 95%, preferably at no more than 98% and having a weight average molecular weight from about 30,000 to 300,000, typically from 75,000 to 300,000; carboxymethy cellulose typically having a weight average molecular weight up to 500,000; gelatine; agar; polyvinyl pyrrolidine; polyacrylamide; inorganic stabilizers, such as alumina, bentonite, magnesium silicate; surfactants, such as sodium dodecyl benzene sulfonate; or phosphates, like tricalciumphosphate, disodium-hydrogen phosphate, optionally in combination with any of the stabilizing compounds mentioned earlier. In some cases the stabilizer effectiveness may be enhanced by using an extender. One skilled in the art may readily determine the usefulness of any particular stabilizer or combination of stabilizers and/or extenders. The amount of stabilizer may suitably vary from 0 up to 10 weight %, usually 0.01 to 10, preferably 0.1 to 8, most preferably 0.1 to 5% by weight, based on the weight of the continuous phase and depending on the viscosity of liquid to be atomized (e.g. higher viscosity liquids require more stabilizer). If the suspending aid or stabilizer is added to the liquid to be atomized it may be added in an amount to provide the same amount of stabilizer.

The suspension stabilizer should be capable of forming a surface between the continuous phase and the dispersed liquid having an interfacial tension of not less than 3, preferably not less than 8, most preferably greater than or equal to 12 dynes /cm.

In accordance with the present invention, one or more members selected from the group consisting of initiators, anti-static agents or additives, flame retardants, pigments (colorants) or dyes, fillers, stabilizers (UV and /or heat and light), coating agents, plasticizers, chain transfer agents, crosslinking agents, nucleating agents, and insecticides and or rodenticides may be added to either the liquid to be atomized, the continuous phase, or both, in an amount from 0 up to 10 weight %, typically from 0.1 to 10, and generally 0.05 to 8, but preferably from 0.1 to 5 weight % of the liquid to be atomized.

Suitable initiators are organic peroxy compounds, such as peroxides, peroxy carbonates and peresters. Typical examples of these peroxy compounds are $C_{6-20}$ acyl peroxides, such as decanoyl peroxide, benzoyl peroxide, octanoyl peroxide, stearyl peroxide, peresters, such as t-butyl perbenzoate, t-butyl peracetate, t-butyl perisobutyrate, t-butylperoxy 2-ethylhexyl carbonate, carbonoperoxoic acid, (1,1-dimethylpropyl) (2-ethylhexyl) ester, hydroperoxides and dihydrocarbyl peroxides, such as those containing $C_{3-10}$ hydrocarbyl moieties, including di-isopropyl benzene hydroperoxide, di-t-butyl peroxide, dicumyl peroxide or combinations thereof.

Other initiators, different from peroxy compounds, are also possible, as for example azides such as 2,2'-azobisisobutyronitrile. The amount of initiator is suitably from 0.01 to 1.00 weight %, based on the amount of liquid to be atomized.

The continuous liquid or the liquid to be atomized may also contain an anti-static additive or agent; a flame retardant; a pigment (colorant) or dye; a filler material, plasticizers, such as white oil. The continuous liquid or the liquid to be atomized may also contain coating compounds typically comprising silicones; metal or glycerol carboxylates, suitable carboxylates include glycerol mono-, di- and tri-stearate, zinc stearate, calcium stearate, and magnesium stearate; and mixtures thereof. Examples of such compositions have been disclosed in GB Patent No. 1,409, 285 and in Stickley U.S. Pat. No. 4,781,983. The coating composition can be applied to the particles via dry coating or via a slurry or solution in a readily vaporizing liquid in various types of batch and continuous mixing devices. This coating aids in preventing the foamed cellular particles from forming agglomerates during the pre-expansion stage, and therefore, aids in improving the quality of the molded foamed article.

The continuous liquid phase or the liquid to be atomized, or both may contain various additives such as chain transfer agents, suitable examples including $C_{2-15}$ alkyl mercaptans, such as n-dodecyl mercaptan, t-dodecyl mercaptan, t-butyl mercaptan and n-butyl mercaptan, and other agents such as pentaphenyl ethane and the dimer of α-methyl styrene. The liquid to be atomized, or the continuous phase may contain cross-linking agents, such as butadiene and divinylbenzene, and nucleating agents, such as polyolefin waxes. The polyolefin waxes, i.e., polyethylene waxes, have a weight average molecular weight of 500 to 5,000. The waxes may be used in a quantity of 0.05 to 1.0% by weight, based on the amount (weight) of the liquid to be atomized. The continuous phase or the liquid to be atomized may also contain from 0.1 to 0.5% by weight, talc, organic bromide-containing compounds, and polar agents as described in e.g. WO 98/01489 which may comprise alkylsulphosuccinates, sorbital-$C_8$–$C_{20}$ carboxylates, and $C_8$–$C_{20}$ alkylxylene sulphonates. Nucleating agents may be incorporated in the continuous phase or the liquid to be atomized, or both and they are particularly useful because they tend to improve the formation of cells if the invention is used to form foamable polymers.

Suitable insecticides are disclosed in U.S. Pat. Nos. 6,153,307 and 6,080,796. These include boron compounds (borates and boric acid). Some useful insecticides may be selected from the group consisting of 1-[(6-chloro-3-pyridinyl)methyl]-4,5-dihydro-N-nirto-1H-imidazol-2-amine and 3-(2,2-dichloroethenyl)-2,2-dimethylcyclopropanecarboxylic acid cyano (3-phenoxyphenyl)-methyl ester (cypermethrin), the active ingredient in, for example, Demon TC sold by Zeneca; 3-(2,2-dichloroethenyl)-2,2-dimethylcyclopropanecarboxylic acid (3-phenoxyphenyl) methyl ester (permethrin), the active ingredient in, for example, Dragnet FT and Torpedo sold by Zeneca; and 1-[(6-chloro-3-pyridinyl)methyl]-4,5-dihydro-N-nirto-1H-imidazol-2-amine (imidacloprid), the active ingredient in, for example, Premise sold by Bayer.

In one embodiment the liquid to be atomized contains from 0 to about 40, preferably from 3 to 20, most preferably from 8 to 15 weight % of water to produce polymer particles having from 4 to 16% of water as taught in U.S. Pat. No. 6,176,439. Or the liquid to be atomized may contain from 1 to 20, most preferably from 3 to 15 weight % of water as taught in column 3, lines 19–26 of U.S. Pat. No. 6,160,027 (WO98/01489) discussed above. The text of these patents is herein incorporated by reference.

The pressure atomizers used in accordance with the present invention typically are circular orifices and have diameters from 0.01 to 2, preferably from 0.1 to 1, most preferably from 0.1 to 0.8 mm, desirable from 0.1 to 0.5, most desirable from 0.1 to 0.4 mm and a length less than about 5 mm. Generally, the atomizer will have a length to diameter (L/D) ratio ranging from about 0.2 to about 10, preferably from 0.2 to 5.

For industrial-application the liquid to be atomized may be injected into the continuous phase using an atomizer or a header plate containing atomizers (e.g., a plate having a number of holes of the above dimensions therein). The number of atomizers which may be accommodated in a header plate will depend on the size of the plate and the size and spacing of the atomizers. A header plate may contain multiple atomizers provided their operations do not interfere with each other. Care should be taken to minimize the interaction between atomized streams, particularly in the vicinity of the atomizer exits. There is a need to space the individual atomizers sufficiently far apart to minimize the interaction between adjacent streams from adjacent atomizers. Excessive interactions between adjacent streams may cause deformation of the atomized droplets due to their direct collisions or may lead to premature dispersion of the streams (e.g. the continuous stream of liquid to be atomized) into droplets. The interactions between adjacent streams of liquid to be atomized do not appear to be significant when adjacent streams are separated by a distance of at least 5, preferably 10 times the average diameter of the atomized droplets.

The atomizers may be equally spaced in a square or other pattern over the entire surface of the header plate.

In order to reduce viscosity of the liquid to be atomized to improve quality of atomization, in one embodiment of the invention heat is applied to the liquid to be atomized at one or more locations selected from the group consisting of the storage tank for the liquid to be atomized, the transfer line from the storage tank to the atomizer inlet, and the atomizer.

The liquid to be atomized contained in the storage tank and/or in the transfer line may be heated to a temperature from ambient (20° C.) up to below the decomposition point of the components of the liquid (e.g. decomposition point of polymer in the liquid to be atomized). In one embodiment of the invention the temperature may be the set temperature of the process if, for example, the atomized liquid is to be polymerized up to about 135° C. The temperature may range from at least about 30° C., preferably not less than 45° C., and most desirably not less than 50° C. Generally temperatures from about 50° C. to 95° C. are useful (for atomization).

The atomizers may also be heated to similar temperatures. For example, the exit part of the atomizer comprising the orifice plate could be heated with a circulating liquid such as water or another heat transferring liquid or, preferably could be heated by other means such as electrical heaters.

The liquid to be atomized may be dispersed in the continuous phase in an amount from about 0.01 to 60 volume %, preferably from about 10 to 50 volume %, and most preferably from about 15 to 45 volume %. Additives, as discussed above, may be added to the continuous phase in a total combined amount from 0.01 to 15, volume %, and preferably 0.05 to 10 volume %.

The liquid to be atomized is added to the continuous phase at a rate from 0.05 to 15, typically 0.1 to 12, and preferably 0.5 to 10 ml/sec/per atomizer. The liquid is passed through the atomizer located below free surface of the continuous phase and forms a liquid stream within the continuous phase and this stream disperse downstream the atomizer exit as the liquid droplets in the continuous liquid phase. The average size of the atomized droplets is determined by the atomizer geometry, monomer exit velocity from the atomizer and properties of both continuous and atomized phases. A higher viscosity suspending medium may be employed in the preparation of larger droplets of atomized liquid. Typically the droplets will have an average size from about 0.1 to 10 mm, typically from 0.1 to 5 mm, preferably from 0.3 to 3 mm. For relatively uniform atomized droplets the standard deviation for size distribution is typically less than about 10% (preferably less than 8%) of the average droplet diameter of atomized liquid. Typically for a droplet size from about 0.3 to 5 mm the standard deviation from the mean droplet droplet is from about 0.03 to 0.35 mm (e.g. not more than 8% of the average droplet diameter). It should be noted that the average droplet diameter is substantially larger than the diameter of the atomizer.

The liquid to be atomized is forced through the atomizer (s) under pressure. Typically the pressure is not greater than 100 bars (e.g. 3 to 100 bars), typically from 3 to 80, preferably from 5 to 60 bars. The pressure energy of the atomized liquid is converted in an atomizer to a stream kinetic energy. This kinetic energy further leads to stream disintegration when a stream interacts with the atomizer orifice exit and with the surrounding continuous phase. This interaction generates a disturbance which breaks the stream into droplets either at the atomizer exit or the disturbance propagates downstream within the stream and breaks the stream into droplets at some distance further from the atomizer exit. In one embodiment of the invention the pressure of the flowing liquid to be atomized is subject to continuous or intermittent pulsation upstream of the atomizer inlet of less than 20%, typically from 1 to 10, preferably from 3 to 10%, of the static pressure of the atomized liquid. The frequency of the pulsation depends, among other parameters, on the viscosity of the atomized liquid and may range from 1 to 500, preferably less.than 200 Hz, generally less than 150 Hz. The imposed pressure pulsation strengthens and amplifies the original disturbance generated by the stream-atomizer interaction in a way that affects droplet size distribution and, usually, makes it more uniform. By adjusting frequency and amplitude of the imposed pressure pulsation, a dual size or customized distributions can be generated. In the case of atomization of more viscous Non-Newtonian liquids, pressure pulsation can be imposed as a primary mechanism/source of stream breakup (droplet formation).

Preferably, the atomization may take place directly into a reactor under the free surface of the continuous phase or it may take place into a holding tank for subsequent transfer to a reactor. The atomized droplets should be maintained under shear and turbulence conditions which minimize droplet interaction and provide a low momentum movement of the droplets in order to decrease probability of droplet agglomeration or secondary breakup. Generally, the conditions should require a flow pattern within the continuous phase with low, preferably relatively uniform, shear and low and controlled turbulence level. Advantageously, the continuous phase may be subjected to laminar motion, which preferably, should be substantially uniform through the continuous phase volume, as opposed to a local laminar motion zone which a low speed impeller may generate.

Such conditions are particularly important if the atomized droplets are subsequently processed or polymerized and the initial size distribution should be either maintained during the process, or improved, or modified (reduced) in a controlled manner, resulting in the required final size distribution of the bead product.

During the processing or polymerization, the liquid droplets or solid particles of the dispersed phase should usually remain submerged below the free surface of the continuous phase and be thoroughly (uniformly) distributed in the continuous phase in a way that minimize their interaction, (e.g. particle or droplet collision) but also provides other requirements, for :example an adequate heat transfer.

The proposed method for maintaining such conditions is a process for creating a low shear flow pattern with a controlled low turbulence level, without mechanical agitation, in a continuous liquid phase contained a vessel, comprising continuously or periodically injecting into selected part(s) of the vessel a stream of fluid immiscible and inert to the vessel contents and having a density lower than the reactor contents, and retrieving this fluid above free surface of liquid phase and, preferably, reinjecting it back to the vessel. Preferably, the injected fluid is an inert gas not soluble in the continuous and dispersed phases.

If the initial particle size distribution needs to be preserved to the largest extent during processing, the dispersed particles, ideally, should be distributed uniformly within a volume of the continuous phase, exposed to a low shear and remain in a laminar motion within the continuous phase.

There is also an option that the initial particle size distribution may be improved to become more uniform and the average diameter slightly reduced. In this option, a certain percentage of the largest particles (e.g. up to 15% of the largest particles) in the population should be broken in a controlled manner, by being exposed to low turbulence low shear flow pattern in the continuous phase.

In a further embodiment the entire particle size distribution can be reduced by causing a secondary break up of majority (e.g. at least 85%) of the droplets in the dispersed phase.

In accordance with the present invention, the required flow pattern can be created in the vessel by injecting one or more streams of a fluid having a density substantially lower than the continuous and dispersed phases and inert and immiscible with the reactor contents, into selected locations, preferably including the bottom parts of the reactor or vessel volume. The fluid may be continuously or periodically injected, (to keep the dispersed phase from sinking to the bottom of the reactor or rising to the free surface of the continuous phase), with a controlled frequency of injection depending on the ratios of densities and volumes of the continuous and dispersed phases.

Preferably, such a fluid with a sufficiently low density suitable for injection is a gas. The gas may be selected from the group consisting of inert gases, not soluble in continuous phase, air and nitrogen, preferably nitrogen. The gas may be injected into the continuous phase at gauge pressure up to 15 bar (e.g. from 0.001 to 15 bar gauge). The gauge pressure referred to in this specification is the difference between the absolute static gas pressure upstream the gas injection port, and the combined (sum of) hydrostatic pressure of continuous liquid in a vessel and an absolute ambient static pressure above free surface of continuous phase.

If gas is selected as the fluid injected to the reactor, two modes of injection are possible.

The first and preferred mode of injection is to inject gas at low pressure (preferably less than 3 bar gauge) through the injection ports, so the injected gas forms streams of bubbles in the continuous phase downstream the injection ports, with the average size of a bubble substantially larger (e.g. at least two times, preferably five times) than the average diameter of the dispersed phase droplets. Due to the balance of buoyancy, gravity add drag forces, the bubble stream rises towards the free surface of the continuous phase where the gas is recovered and, preferably, recycled back to the vessel. As the gas bubble stream flows towards the free surface, it interacts with the continuous liquid phase and its momentum creates a flow pattern in the reactor, forcing the continuous phase into a circular low shear, low turbulence motion creating a recirculation zone in the reactor. The velocity gradients and geometry of the generated zone can be controlled by the geometry (number, diameters and locations) of the gas injection ports and by gas flow rate. The dispersed particles or droplets flow within the recirculation zone and are subjected to the sufficiently low shear rate and turbulence so that they remain submerged without excessive mutual interaction, their momentum sufficiently low, so even when they collide—the probability of agglomeration or breakup resulting from such a low impact collision remaining very low. This motion of particles can be maintained for particles which are lighter than the continuous phase and for the particles which are heavier than the continuous phase, providing that the density difference between dispersed and continuous phase is typically within the range of ±20% (i.e. the ratio of the density of the dispersed phase to the density of the continuous phase may range from 0.8:1 to 1.2:1).

Preferably, the injection ports have diameters substantially (e.g. at least two times) larger than the average diameter of the dispersed droplets. The locations of the gas injection ports are selected based on the concentration of the dispersed phase and the dispersed particle density. Generally, the injection ports should be located in the reactor below the layer of the dispersed phase contained in the continuous phase. Accordingly, to submerge dispersed particles having a density lower than the density of the continuous phase and to prevent their floating motion, the injection ports should be beneath the floating particle/droplet layer and can be located in the reactor walls or in the bottom.

To elevate particles/droplets heavier than continuous phase and to prevent their sedimentation on the vessel bottom, some of the injection ports have to be located in the bottom of the reactor. In this case, a modification of the geometry of the reactor bottom, e.g. into an inverted conical or frustroconical type of a shape, may be desirable. In one embodiment of the present invention (FIG. 1) the reactor bottom is inverted conical, with one injection port situated in the tip of the cone and two other ports located tangentially to the cone cross section, at the level of half-height of the cone.

If the density of the dispersed particles changes during the process, as for example during polymerization of the dispersed monomer droplets, a combination of both types of port arrangements (i.e. in the reactor walls and bottom) can be used. The most useful general arrangement of the port locations is with the main ports located in the reactor bottom and, optionally, some supporting ports in the lower parts (e.g. bottom half, preferably bottom quarter) of the reactor walls.

Mainly, the gas injection rate determines the level of turbulence in the created flow pattern in the reactor. The gas injection rate will depend on a number of factors including the volume and density ratios of the dispersed and continuous phases; the viscosity of the continuous phase; the geometry of the vessel; and the size of the particles of the dispersed phase. Suitable gas injection rates may be determined by one skilled in the art by repeating experiments similar to those contained herein.

Generally, to preserve the initial size distribution of the dispersed particles or droplets to the largest extent, the level of turbulence of the continuous flow phase in the reactor has to be sufficiently low so the motion of the reactor contents is laminar.

If required, the initial particle or droplet size distribution can be also modified to a certain extent during the processing by properly adjusting, gas flow rate. Although the average particle size cannot be increased by a controlled agglomeration of particles, it can be reduced in some cases or improved towards more uniform distribution by increasing the gas injection rate to cause the breakup of only the largest particles (e.g. the 15% of the largest particles) in the population. The breakup is caused by the controlled increase of the turbulence level within the flow pattern created by the gas bubbles, and not by particle or droplet interaction (e.g. collision).

In the further embodiment of the present invention, the average particle size of the dispersed phase can be substantially reduced by causing a break up of majority (e.g. at least 85%) of the droplets in the dispersed phase. In this embodiment a flow pattern with higher shear and turbulence level is generated in the continuous phase by applying higher gas injection rates, to break up the droplets.

The second mode of gas injection can be applied only in the processes where the dispersed particles which are to be distributed and suspended have a density lower than the continuous phase. In this mode gas is injected at high pressure, typically 5 bar (gauge) and above, to generate a large number of very small gas bubbles, distributed within the volume of the continuous phase. The injection ports have diameters at least an order of magnitude, preferably, several orders of magnitudes smaller than the average diameter of the dispersed particles. The concentration of gas bubbles should be sufficiently high so the effective density of the continuous phase becomes reduced to a value lower than the density of the dispersed phase and, as the result, the dispersed particles start to sink. In this mode the periodic gas injection can be particularly useful in creating an "oscillatory" movement of the particles or droplets, as during the injection period the particles or droplets sink and next when gas supply is shut off and gas bubbles leave the continuous phase exiting through the free surface of the continuous phase, the particles rise from the bottom part of the vessel or reactor and float again towards the free surface. The next gas injection should take place before the particles of the dispersed phase reach the free surface of the continuous phase. The mechanism responsible for small size of bubbles is mainly turbulence of a gas stream. Bubbles rise towards the free surface, usually with high velocity, their residence time in a continuous phase is brief but the flow pattern generated in the continuous phase can be at a much higher turbulence level than in the first mode of injection. Therefore where necessary, care should be taken not to break floating particles or droplets. In this mode of injection, a higher viscosity (typically 10 cP or higher) of the continuous phase is advantageous, as it slows down the gas bubbles increasing their residence time in the continuous phase and reduces the overall level of turbulence in the vessel.

Typically, the polymerization of the dispersed droplets will be to not less than 90%, preferably 95%, most preferably 99.5% or to a greater conversion. The continuous liquid will be heated during the process, as discussed above, to temperatures up to 135° C., typically not more than 130° C.

The resulting particles may be used in a number of applications such as ion exchange resins or applications requiring a uniform or customized particle size distribution.

However, in a further embodiment of the invention, the polymerization of the atomized liquid takes place in the presence of a blowing agent. The blowing agent may be incorporated in the continuous liquid phase or the liquid to be atomized. If the blowing agent is in the continuous liquid phase it may be present in amounts from 2.5 to 7 weight % based on the weight of the atomized liquid. If it is introduced into the liquid to be atomized it would be used in corresponding amounts.

Figure 4:
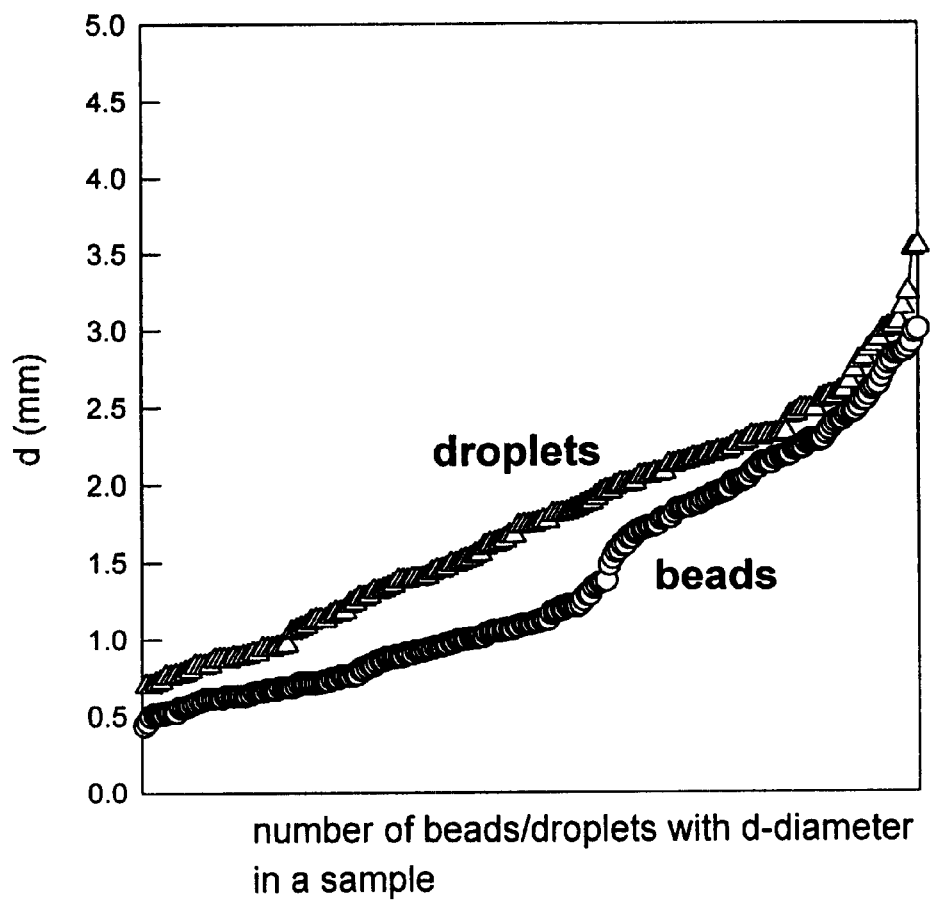
FIG. 4 is a comparison of the initial size distributions of pressure atomized droplets of partially polymerized to 35% styrene monomer and the resulting beads, which were polymerized in a flow pattern of the present invention in accordance with example 1. The droplets and the polymerized beads were taken as the random samples for the respective populations.

In another embodiment the polymerization may be finished and the resulting polymer beads are obtained and subsequently impregnated with a blowing agent. The polymer beads or particles would be re-suspended in a liquid medium, such as water and the medium would additionally contain from 2.5 to 7 weight % based on the polymerized dispersed liquid (e.g. polymer beads) of a blowing agent.

Suitable organic blowing agents are well known to those skilled in the art and are typically selected from the group consisting of: acetone, methyl acetate, butane, n-pentane, hexane, isobutane, isopentane, neopentane, cyclopentane and cyclohexane and mixtures thereof. Other blowing agents used in making polymer particles expandable are HFC'S, CFC'S, and HCFC'S, and mixtures thereof. In some cases water may be used as a blowing agent for example as disclosed in EPO applications 99947397.8, 99952459.8 and 97932783.0.

Preferably, in the present invention, the blowing agent is selected from the group consisting of acetone, methyl acetate, butane, n-pentane, cyclopentane, isopentane, isobutane, neopentane, and mixtures thereof. A preferred blowing agent is normal pentane and mixtures of pentane. The foregoing blowing agents may also be used in combination with carbon dioxide, air, and nitrogen.

The present invention will now be illustrated by the following non-limiting examples, all of them comprising polymerization of the atomized partially polymerized styrene droplets, suspended in the flow pattern created by gas injection into continuous phase according to the first preferred mode.

Experimental Set Up.

The pressure atomization experimental set up is schematically shown in FIG. 1. The liquid to be atomized was placed in a cell or chamber 1. At the top of the cell a plunger 2 was inserted to apply static pressure to the liquid and to control the flow rate of liquid to be atomized through the atomizer 15. The plunger 2 was driven by a screw actuator 3 and a servo motor 4. The outlet 5 from the cell 1 was connected to a transfer line 6. Portions or the entire length of the transfer line 6 were jacketed 7 to apply heat to the flowing liquid. The static pressure of the liquid in the transfer line 6 was measured by a static pressure transducer 8. A pressure pulsation generator 9 was also connected to the transfer line 6 in a way that it generated pressure pulsation by a mechanical motion in the direction perpendicular to the flow of the to-be-atomized liquid. The resulting instantaneous pressure of the liquid to be atomized was measured by the fast response pressure transducer 11 also connected to the transfer line 6. A thermocouple 10 was in the transfer line to control the heat applied to the liquid flowing in the line. The transfer line 6 delivered the liquid to be atomized to an atomizer 15, located in the bottom of a reactor 14, filled with a continuous liquid phase (water with stabilizing agent) 13. The reactor was jacketed 12 so it could be heated or cooled. The atomizer could be changed to provide a different diameter and L/D ratio.

A sample of the continuous phase containing about several thousand of atomized liquid droplets was analyzed for the particle size distribution by viewing it via camera under a 7× microscope and taking photographs of the droplets. Then the photographs were processed by a computer to determine the droplet diameters, (using commercially available software). The size distribution, including the average diameter and the standard deviation were calculated and the results were converted (using customized software) to generate the plots shown in the Figures.

The experimental set up to maintain the pressure atomized particles in low shear controlled turbulence flow pattern, which is a more detailed sketch of the reactor 14 in FIG. 1, is shown in FIGS. 2 and 3.

In FIGS. 2 and 3, the reactor vessel 14 having a heat jacket 12 was partially filled with a continuous water phase 13 mixed with the stabilizing agent and a dispersed phase 16 of partially polymerized styrene monomer. At the bottom of the reactor was a vertical gas injection port 17 and on the sides of the bottom half of the reactor were two tangential injection gas ports 18. An exit line 19 draws gas from above the free surface of the continuous phase 13 and gas can be removed from the top of the reactor 20 either to the exhaust stack or recirculated, using a blower, back to injection ports 17 and 18 to inject gas back into the continuous phase in the vessel. Nitrogen was selected as the injection gas and was introduced into the injection ports at gauge pressure of less than 0.05 bar generating strings or streams of large bubbles 21, with approximate diameter of 15–20 mm.

At the end of each experiment the equipment was drained and cleaned for the next experiment.

Atomization

In all atomizations, pressure pulsation was applied to modulate the flow of liquid to be atomized.

A solution of styrene monomer prepolymerized to 35 wt % mixed with benzoyl peroxide (BPO) or dilauryol peroxide initiators, either pre-heated to ~45° C. in the transfer line or at ambient temperature, were dispersed by pressure atomization into the jacketed reactor containing the continuous phase comprising water and 3 wt % polyvinyl alcohol as a stabilizer, the continuous phase being at ambient temperature.

The flow rates of the atomized monomers ranged from 1.3 to 0.35 ml/s through the atomizer. The atomizer diameter was 0.3 mm. A pressure pulsation with the amplitude of about 8%–10% of the static pressure of the liquid to be atomized and at a frequency of up to 100 Hz was imposed on the pre-polymerized monomer flowing in the transfer line by the pulsation generator upstream the atomizer inlet.

Particle Size

A random sample of the continuous phase containing about several hundred of atomized liquid droplets was analyzed for the particle size distribution by viewing it via camera under a 7× microscope and taking photographs of the droplets. Then the photographs were processed by a computer to determine the droplet diameters, (using commercially available software). The cumulative size distribution including the average droplet diameter and the standard deviation of the size distribution were calculated (using commercially available software), and the results were converted (using customized software) to generate the plots shown in the Figures. The similar procedure was used to determine the size distributions of the polymerized beads.

EXAMPLES

Example 1

The initial sizes of the monomer droplets had a relatively wide distribution and they were measured by collecting a random sample and analyzing it via camera under a microscope. Initially, the dispersed phase had a density lower than continuous phase and the droplets would have formed a layer floating at the free surface of the continuous phase in the reactor. To distribute the droplets within the reactor volume, nitrogen was injected through the central and two tangential injection ports in the bottom part of the reactor and the resulting stream of bubbles created a flow pattern where the dispersed droplets were suspended. To start the polymerization process the reactor contents were heated to 90° C. and the temperature was maintained for the subsequent ~5 hrs. As polymerization progressed, the dispersed droplets started to sink as their density changed from <0.9 g/cm3 to ~1.1 g/cm3. A random sample of the fully polymerized bead product was analyzed for its size distribution and compared with the initial size distribution of the droplets, as shown in FIG. 4. The size of beads is smaller than the droplets due to density changes, but the overall shape of the initial droplet size distribution has been retained in the size distribution of the product (i.e. beads).

Example 2

Figure 5:
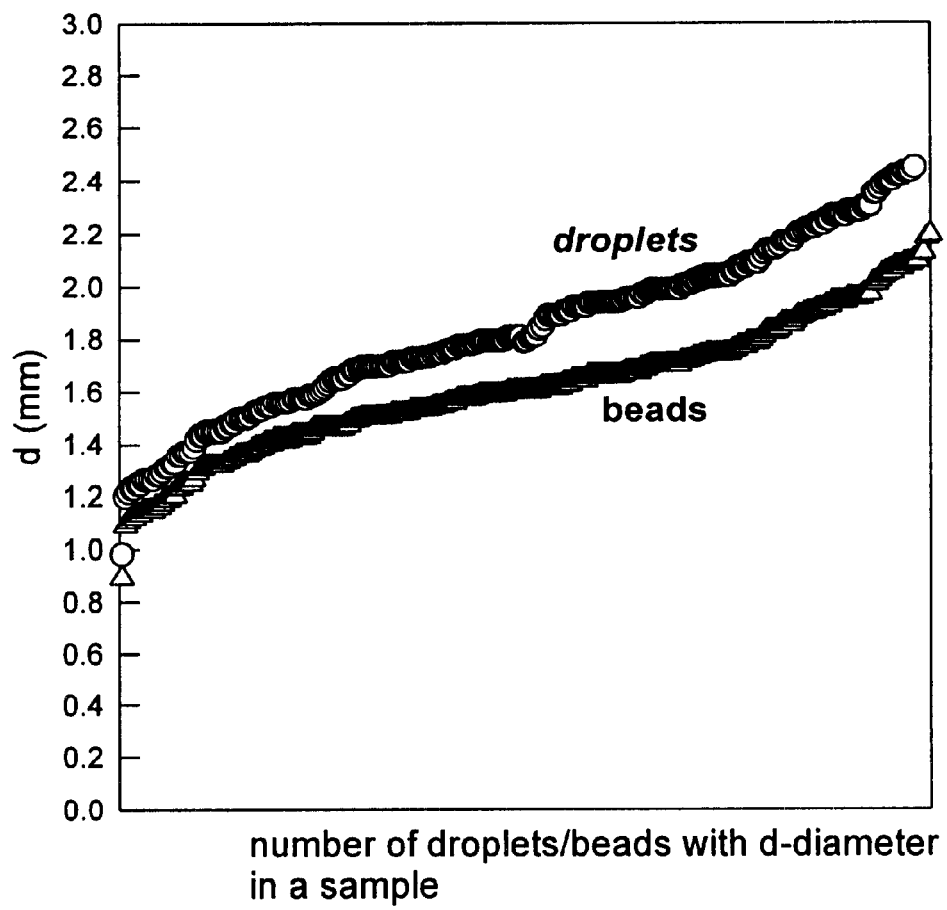
FIG. 5 is a comparison of diameters of the pressure atomized droplets of styrene monomer partially polymerized to 35%, the droplets taken as a random sample, and the resulting polymerized beads, which were polymerized in a flow pattern of the present invention in accordance with example 2, taken also as a random sample.
Figure 6:
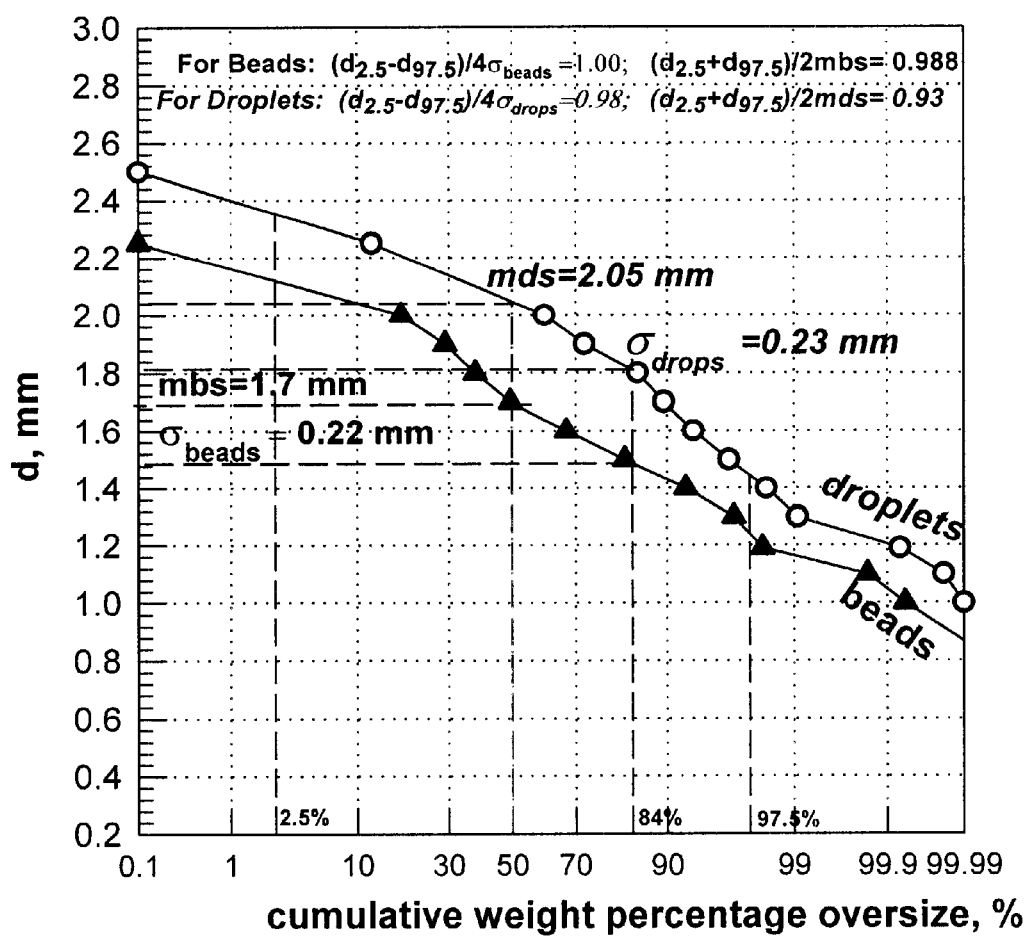
FIG. 6 shows the comparison of the size distributions (cumulative weight percentage oversize) of the pressure atomized droplets of styrene monomer and the resulting polystyrene beads polymerized in flow pattern of the present invention in accordance with example 2, and whose sizes were shown in FIG. 5.

The initial size distribution of the monomer droplets was measured by collecting a sample and analyzing it via camera under a microscope (7× magnification). To distribute the droplets within the reactor volume, nitrogen was injected through two tangential injection ports located above the bottom of the reactor and through one port centrally located in the reactor bottom. The polymerization process was completed after approximately 5 hrs, keeping the reactor contents at a temperature of ~90° C. The resulting polymerized beads were analyzed for size distribution and compared with the initial size distribution of the droplets as shown in FIG. 5. The cumulative weight percentage oversize calculated for the initial droplets and for the final bead product is shown in FIG. 6, and the results indicate that smaller droplets retained their size well during the polymerization process (considering change of density) while large droplets were more prone to some secondary breakups. However, the secondary breakups of the largest droplets slightly improved the overall size distribution of the product making it more uniform than the initial size of the droplets.

Example 3

Figure 7:
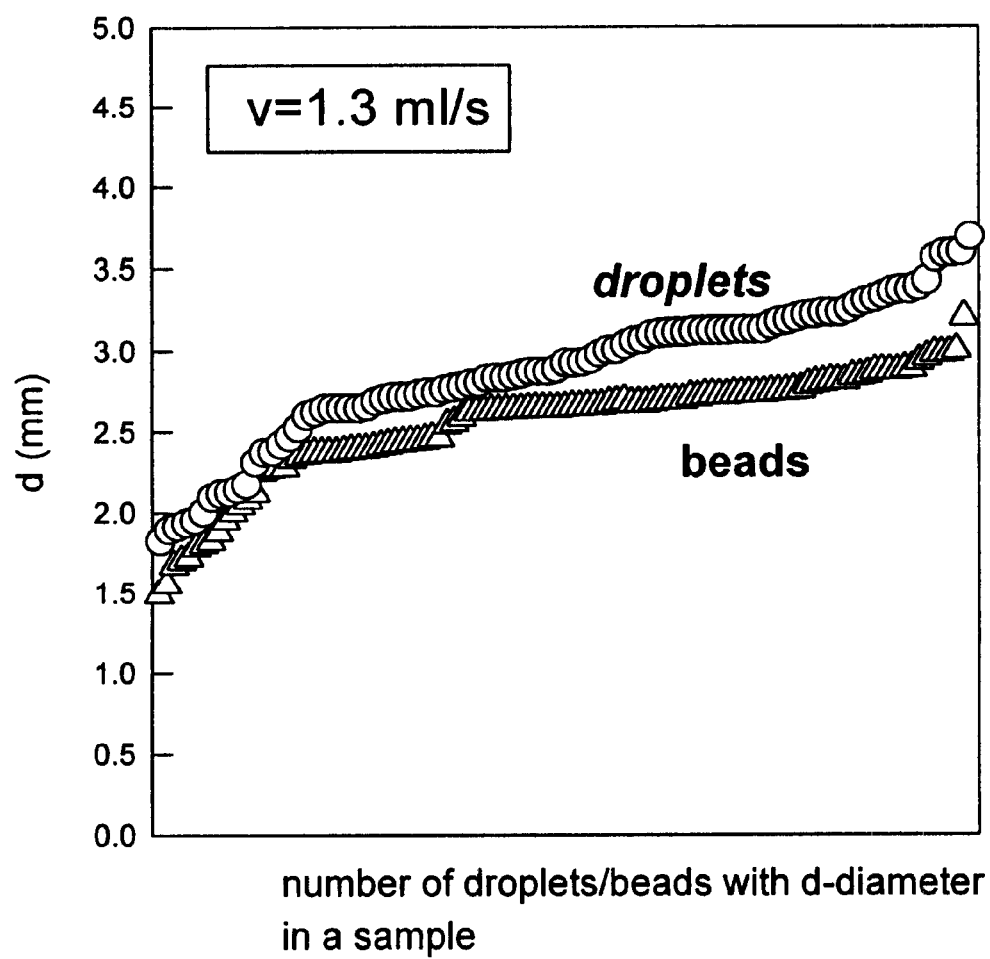
FIG. 7 is a comparison of diameters of the droplets of styrene monomer partially polymerized to 35%, pressure atomized at ambient temperature, with modulation frequency 80 Hz and amplitude less than 8% of static pressure of the monomer, the droplets taken as a random sample, and the resulting beads, taken also as a random sample, which were polymerized in a flow pattern of the present invention in accordance with example 3.
Figure 8:
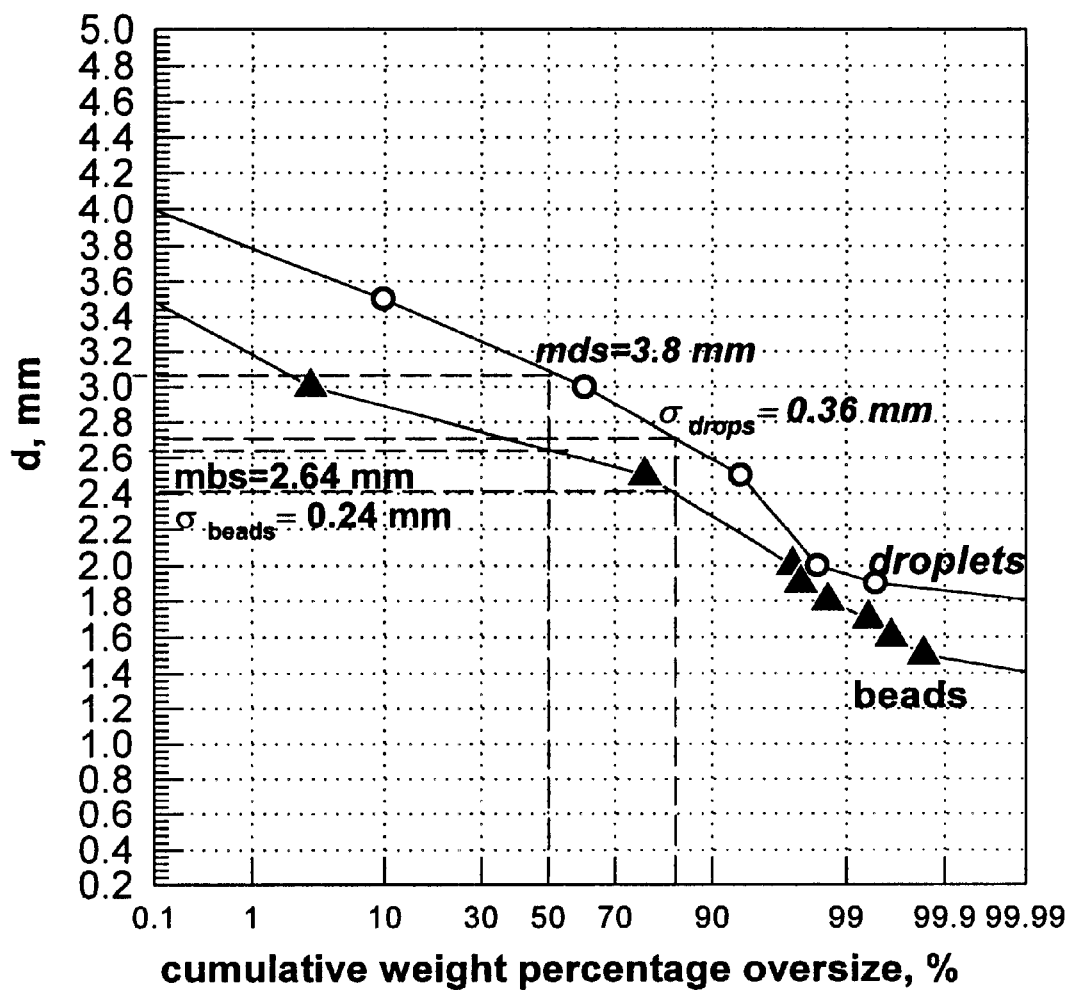
FIG. 8 shows the comparison of the size distributions (cumulative weight percentage oversize) of the pressure atomized droplets of styrene monomer and the resulting polystyrene beads polymerized in flow patter of the present invention in accordance with example 3, and whose sizes were shown in FIG. 7.

The dispersed phase were the droplets of styrene monomer partially polymerized to 35%, pressure atomized at ambient temperature, with modulation frequency 80 Hz and amplitude less than 8% of static pressure of the monomer. The initial size distribution of the droplets was measured by collecting a random sample and analyzing it via camera under a microscope (7× magnification). To distribute the droplets within the reactor volume during polymerization process, nitrogen was injected through two tangential injection ports located above the bottom of the reactor and through the port centrally located in the reactor bottom. The polymerization process was completed after approximately 5 hrs, keeping the reactor contents at a temperature of ~92° C. The resulting polymerized beads were analyzed for size distribution and compared with the initial size distribution of the droplets, as shown in FIG. 7. The results of the comparison indicate that smaller droplets retained their size better during the polymerization process (considering change of density) while large droplets were more receptive to some secondary breakups. However, the overall cumulative size distribution of the bead product was improved and was more uniform as compared to the initial size distribution of the droplets. The comparison results are shown in FIG. 8.

What is claimed is:

1. A process comprising pressure atomizing from 0.01 to 60 volume % of a non-Newtonian immiscible liquid having a density ±20% of the density of a continuous liquid phase, at a pressure of at least 5 bar, below the free surface of the continuous liquid phase which may be stationary or flowing, contained in a holding tank or a tank, pipe or loop reactor, to produce a dispersion of atomized droplets of the immiscible liquid having at least one controlled average diameter from 0.1 mm to 10 mm and processing/polymerizing the dispersed phase in a low shear flow pattern with a controlled low turbulence level created, without mechanical agitation, by continuously or periodically injecting at gauge pressure up to 15 bar into selected parts of the reactor one or more streams of gas inert to the reactor contents having a density lower than the continuous phase and immiscible with the reactor contents and recovering this gas from the top of reactor, above free surface of the continuous phase.

2. A process according to claim 1, comprising passing the liquid to be atomized through at least one atomizer having an opening diameter from 0.01 mm to 2 mm and an L/D ratio from 0.2 to 10, at a flow rate from 0.05 to 15 ml/second/per atomizer and at gauge pressure from 3 to 100 bar.

3. The process according to claim 2, wherein the continuous phase is a liquid having a viscosity up to 150 cP.

4. The process according to claim 3, wherein the continuous phase further comprises from 0.1 to 10 weight % based on the weight of the continuous phase of one or more suspension stabilizers.

5. The process according to claim 4, wherein the gas is selected from the group consisting of air and nitrogen.

6. The process according to claim 5, wherein the said gas is injected at a gauge pressures up to 15 bar into the reactor through injection ports located in the bottom portion of the reactor and in the reactor walls.

7. The process according to claim 6, wherein the liquid to be atomized further comprises from 0 to 10 weight % based on the weight of the liquid to be atomized of one or more members selected from the group consisting of initiators, anti-static agents, flame retardants, pigments, dyes, fillers, UV stabilizers, heat and light stabilizers, coating agents plasticizers, chain transfer agents, crosslinking agents, nucleating agents, insecticides and rodenticides.

8. The process according to claim 7, wherein the suspension stabilizer is polyvinyl alcohol having a molecular weight greater than 30,000, which has been hydrolyzed up to 98%.

9. A process according to claim 8, wherein the flow of the liquid to be atomized may optionally be modulated with a step-type amplitude at the constant frequency by imposing up stream of the atomizer a pressure pulsation of an amplitude of less than 20% of the static pressure on the liquid and at a frequency up to 200 Hz.

10. The process according to claim 9, wherein the liquid to be atomized is selected from the group consisting of one or more monomers which have been polymerized to from 25 to 50% and one or more monomers having dissolved there in from 25 to 50 weight % of a polymer soluble is such monomers.

11. The process according to claim 10, wherein the one or more monomers are selected from the group consisting of $C_{8-12}$ vinyl aromatic monomers which are unsubstituted or substituted by up to two substituents selected from the group consisting of $C_{1-4\ alkyl}$ radicals, acrylonitrile, methacrylonitrile, maleic anhydride, malimide, and $C_{1-4}$ alkyl esters of $C_{1-6}$ monocarboxylic acids.

12. The process according to claim 11, wherein the liquid to be atomized has a viscosity from 1 cP to 4000 cP.

13. The process according to claim 12, wherein to the liquid to be atomized is maintained a temperature from 20° C. to 95° C.

14. The process according to claim 13, wherein the continuous phase is water.

15. The process according to claim 14, wherein the polyvinyl alcohol is present in the continuous phase in an amount from 0.1 to 8 weight % based on the weight of the liquid to be atomized.

16. The process according to claim 15, wherein said one or more monomers are selected from the group consisting of styrene, alpha methylstyrene, para methylstyrene, methyl methacrylate, ethyl methacrylate, butyl methacrylate, methyl acrylate, ethyl acrylate and butyl acrylate.

17. The process according to claim 16, wherein the atomized liquid has a particle size from 0.3 to 5 mm and a standard deviation from the mean particle diameter is from 0.03 to 0.35 mm.

18. The process according to claim 17, wherein the atomizer has an orifice size from 0.1–0.8 mm, the flow rate through the atomizer is from 0.1 to 12 ml/s, and the static pressure of the immiscible liquid is from 3 to 80 bars.

19. The process according to claim 18, wherein the gas is injected into the continuous phase at a gauge pressure less than 3 bar and forms streams of bubbles having diameters substantially larger than the average size of the dispersed phase particles or droplets.

20. The process according to claim 18, wherein the dispersed phase has a density lower than the continuous phase and the said gas being injected periodically at pressures above 5 bar into the continuous phase to generate bubbles at least an order of magnitude smaller than the average size of dispersed particles or droplets, reducing the effective bulk density of the continuous phase.

21. The process according to claim 19, wherein the initial droplet size distribution is substantially preserved in the final polymer bead size distribution.

22. The process according to claim 19, wherein the initial droplet size distribution is modified so that up to 15% of the largest droplets are broken to provide a more uniform polymer bead size distribution.

23. The process according to claim 19, wherein the initial droplet size distribution is reduced so that the majority of the droplets population is broken into a smaller size.

24. The process according to claim 21, further comprising subjecting the atomized liquid to polymerization to not less than 75% conversion at a temperature up to 130° C.

25. The process according to claim 22, further comprising subjecting the atomized liquid to polymerization to not less than 75% conversion at a temperature up to 130° C.

26. The process according to claim 23, further comprising subjecting the atomized liquid to polymerization to not less than 75% conversion at a temperature up to 130° C.

27. The process according to claim 24, wherein said polymerization is conducted in the presence of from 2.5 to 7 weight % based on the weight of the atomized liquid of a blowing agent.

28. The process according to claim 24, wherein the polymerized particles of atomized liquid are impregnated with from 2.5 to 7 weight % of a blowing agent after polymerization.

29. The process according to claim 24, wherein the liquid to be atomized contains from 0 to 40 weight % of water.

30. The process according to claim 25, wherein said polymerization is conducted in the presence of from 2.5 to 7 weight % based on the weight of the atomized liquid of a blowing agent.

31. The process according to claim 25, wherein the polymerized particles of atomized liquid are impregnated with from 2.5 to 7 weight % of a blowing agent after polymerization.

32. The process according to claim 25, wherein the liquid to be atomized contains from 0 to 40 weight % of water.

33. The process according to claim 26, wherein said polymerization is conducted in the presence of from 2.5 to 7 weight % based on the weight of the atomized liquid of a blowing agent.

34. The process according to claim 26, wherein the polymerized particles of atomized liquid are impregnated with from 2.5 to 7 weight % of a blowing agent after polymerization.

35. The process according to claim 26, wherein the liquid to be atomized contains from 0 to 40 weight % of water.

36. The process according to claim 20, further comprising subjecting the atomized liquid to polymerization to not less than 75% conversion at a temperature up to 130° C.

37. The process according to claim 36, wherein the initial droplet size distribution is substantially preserved in the final polymer bead size distribution.

38. The process according to claim 37, wherein said polymerization is conducted in the presence of from 2.5 to 7 weight % based on the weight of the atomized liquid of a blowing agent.

39. The process according to claim 37, wherein the polymerized particles of atomized liquid are impregnated with from 2.5 to 7 weight % of a blowing agent after polymerization.

40. The process according to claim 37, wherein the liquid to be atomized contains from 0 to 40 weight % of water.

* * * * *